United States Patent [19]

Edwards

[11] Patent Number: 4,664,567
[45] Date of Patent: May 12, 1987

[54] DRILL BIT

[75] Inventor: Leonard Edwards, Herts, United Kingdom

[73] Assignee: Bijur Lubricating Corp., Bennington, Vt.

[21] Appl. No.: 826,541

[22] Filed: Feb. 6, 1986

[51] Int. Cl.⁴ ................. B23B 27/10; B23B 51/06
[52] U.S. Cl. ................................ 408/59; 407/11; 408/57
[58] Field of Search ............... 408/56, 57, 59, 60, 408/61, 705; 407/11

[56] References Cited

U.S. PATENT DOCUMENTS

| | | |
|---|---|---|
| 2,348,874 | 3/1943 | Andreasson . |
| 2,882,765 | 3/1956 | Andreasson . |
| 2,903,921 | 10/1957 | Andreasson . |
| 2,935,906 | 7/1957 | Andreasson . |
| 3,010,345 | 8/1958 | Wagner . |
| 3,460,410 | 8/1964 | Briles . |
| 3,606,560 | 5/1968 | McClennan . |
| 4,092,083 | 5/1978 | Larry . |
| 4,137,002 | 1/1979 | Barker et al. . |
| 4,212,569 | 7/1980 | Andersson et al. . |
| 4,284,375 | 8/1981 | Muhleisen . |
| 4,340,327 | 7/1982 | Martins . |
| 4,373,839 | 3/1983 | Negishi et al. . |

FOREIGN PATENT DOCUMENTS

| | | |
|---|---|---|
| 498077 | 1/1951 | Belgium . |
| 140013 | 2/1980 | German Democratic Rep. ............... 408/705 |
| 258873 | 3/1927 | United Kingdom . |
| 1329689 | 9/1973 | United Kingdom . |
| 1383090 | 2/1975 | United Kingdom . |

Primary Examiner—Gil Weidenfeld
Assistant Examiner—Steven C. Bishop
Attorney, Agent, or Firm—Ostrolenk, Faber, Gerb & Soffen

[57] ABSTRACT

A drill bit, particularly for cutting deep holes in hard materials, includes a tubular shank with a solid center and diametrically opposed coolant conduits which supply coolant to a tungsten carbide tip located on one end of the tubular shank. Swarf and debris are carried by the coolant away from the cutting area and along swarf clearance channels located along the exterior of the shank tube out of the borehole. The carbide tip is brazed to the tubular shank and is formed with a pair of angularly spaced tubular chambers which communicate with the coolant conduits in the shank. One cutting edge is provided on top of each chamber in the tip. A coolant hole is formed at the top of each tubular chamber, behind the cutting edge. The coolant which emerges from the tip flows to the space between the tubular chambers and carries with it the swarf along the swarf clearance channels defined by the shank out of the borehole.

12 Claims, 4 Drawing Figures

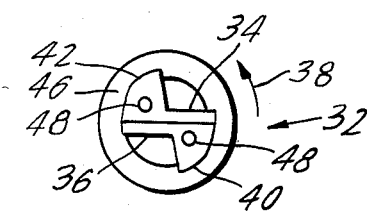
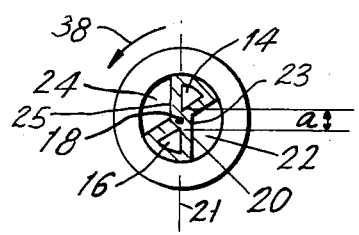
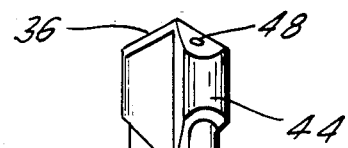
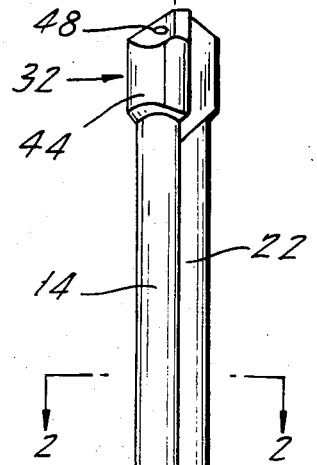
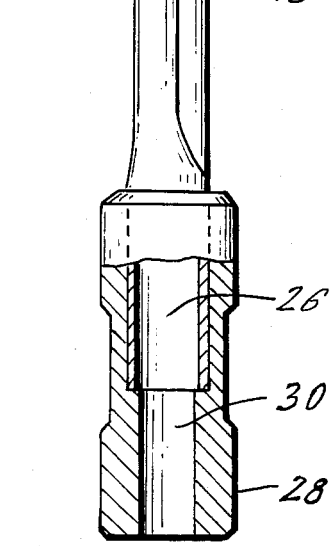

DRILL BIT

BACKGROUND OF THE INVENTION

The present invention relates to a drill bit and particularly to a drill bit usable for deep hole drilling. The drill bit is particularly efficient in delivering coolant to its cutting tip and removing swarf and other debris from the cutting areas.

Various problems associated with drilling deep holes particularly in hard materials such as high temperature stainless steels and aircraft specification No. steels are described in British Patent specification 1 383 090. Briefly summarized, the problems involve keeping the cutting tip of the drill at a reasonable temperature and assuring that the cutting area is kept free of swarf generated by the drilling operation by efficient removal of the swarf and other debris therefrom. For the reasons explained in the foregoing British specification the use of "gun drills", which are expensive and employ high pressure coolant pumps is not practical for many applications.

The foregoing British patent provides a drill which comprises a tubular shank of flattened cross-section which defines one or more passageways for coolant fluid. A flat blade with a drilling tip is positioned at one end of the shank, the blade being oriented not to block the coolant passageways in the shank. Coolant supplied through the passageways impinges on the drilling tip and the cutting area and flows out of the drilled hole along the exterior flattened periphery of the shank, carrying swarf with it. The shank is fashioned from a circular tube which is longitudinally flattened to produce an approximate figure-of-8 shaped cross-section, defining two passageways separated by contacting wall portions of the flattened tube.

Although the above-described bit has advanced the art of drill making, several distinct disadvantages remain. For example, the flattened shank is not sufficiently sturdy, and at greater lengths it is susceptible to buckling and/or to twisting. Further, the flat blade causes coolant to wash over the outside of the blade tending to wash the swarf forward into the cutting area prior to evacuation. This results in less efficient swarf removable and could lead to swarf blockage. Moreover, the flattened shank which is not as hard as the cutting blade is exposed to a major proportion of the force produced by the fast moving swarf. As a result, erosion weakens the braze connection between the blade and the shank and eventual outright breakage will occur. The flat blade provides relatively little control over the size of the bore and its concentricity and, in addition, a less than optimal hole surface finish is obtained. Finally, the blade lacks chip breakers to chip the material being drilled to produce swarf which is not stringy and therefore more efficiently removable.

SUMMARY OF THE INVENTION

It is an object of the present invention to provide a more efficient drill bit which is particularly useful for drilling deep holes in hard materials.

It is another object of the present invention to provide a drill bit with means for supplying a coolant to the cutting tip of the drill bit.

It is a further object of the present invention to provide a drill bit with more efficient swarf removal means.

It is yet another object of the present invention to provide a cutting tool which is brazed onto the shank of a drill bit, the braze connection being less susceptible to being weakened by swirling coolant and swarf.

It is still another object of the present invention to provide a drill bit which gives the operator greater control over bore concentricity and bore surface finish.

It is also an object of the present invention to provide a drill bit with cutting edges which double as chipbreakers which prevent formation of long stringy swarf.

It is another object of the invention to provide a drill bit with greater penetration rates.

The foregoing and other objects of the present invention are realized with a drill bit which includes a tubular shank formed of an initially circular tube which can be formed by being drawn through a die to thereby produce two diametrically opposed fluid passages which extend longitudinally through the shank. The drawing operation draws tightly together opposing interior surfaces of the tube to produce a solid center which extends lengthwise of the tube. Portions of the originally circular peripheral walls of the tube retain their shape in order to maintain the rigidity and sturdiness of the tubular shank. The exterior indentations in the shank which result from the drawing operation define swarf removal channels.

A carbide cutting tool is mounted to one end of the tubular shank. Preferably, a brazed connection is made, although many other securing means are feasible. The cutting tool defines first and second diametrically opposed tubular chambers each of which is in fluid communications with one of the fluid passages in the tubular shank. The exterior wall of each chamber which faces the cutting area has a coolant hole through which coolant is supplied through the shank to the cutting area. A respective cutting edge atop each of the tubular chambers performs the actual cutting operation. As the drill bit rotates, the generated swarf is swept directly by the fluid into the space between the tubular chambers and then along the swarf clearance channels defined by the shank out of the borehole. The cutting tool fits over the end of the shank thereby protecting the brazed connection and the softer shank metal from being eroded.

In a further improvement, peripheral side walls which partially define the first and second tubular chambers in the cutting tool are appropriately curved to form burnishing pads which polish and smooth the peripheral wall of the borehole that is created by the cutting edges of the cutting tool.

In a further embodiment, the cutting edges of the tool taper downwardly from the axial center of the tool to thereby reduce the end load on the cutting tool and generate smaller sized chips, rather than stringy swarf more likely to cause blockage.

Other features and advantages of the present invention will become apparent from the following description of a preferred embodiment of the invention which is described in relation to the following drawings.

BRIEF DESCRIPTION OF THE DRAWINGS

FIG. 1 shows a partly sectioned elevational view of the drill bit in accordance with the present invention.

FIG. 2 is a view taken generally along line 2—2 in FIG. 1.

FIG. 3 is similar to FIG. 1, but rotated longitudinally by 90 degrees relative thereto.

FIG. 4 is a top view of the drill bit showing in particular the Tungsten carbide cutting tool of the drill.

FIG. 5 provides an elevational cross section through the cutting tool and a portion of the shank which fits over the cutting tool.

DETAILED DESCRIPTION OF A PREFERRED EMBODIMENT

Referring to FIGS. 1 and 2, a drill bit 10 in accordance to the present invention comprises a shank 12 formed from an originally circular tube which is drawn through a die to produce first and second fluid passages or conduits 14 and 16, separated by a solid center section 20. Solid center section 20 is formed by indenting opposite portions of the peripheral surfaces of the initially circular tube in a unique manner.

In accordance with the present invention, solid center section 20 has a width "a", as shown in FIG. 2, along which the opposite surfaces are fully in contact and therefore parallel to each other. In contrast to prior art approaches, for example as shown in British Pat. No. 1 383 090, the opposite peripheral surfaces do not curve away from one another, which would produce only tangential contact therebetween. Rather, they are in full contact over the entire width "a" of solid center section 20.

Preferably, solid center section 20 is formed with the help of dies each of which comes into contact with one of the opposite surfaces that are being indented and has an edge, either sharp or slightly curved, that produces a distinct dent line 23 or 25 in one of the surfaces. Moreover, dent lines 23 and 25 are radially offset from one another so that after the surfaces make contact, the "plane" 21 of solid center section 20 is inclined to attack the cutting areas. Thus, the solid center resists forces which otherwise would tend to pull apart the contacting surfaces.

The unique method of forming solid center section 20, situates first fluid conduit 14 on one side of plane 21 while second fluid conduit 16 is on the other side thereof. This construction produces a sturdier and more effective solid center.

The indented portions of the original tube define first and second swarf clearance channels 22 and 24. As will be described in more detail shortly, coolant is introduced to the cutting area through conduits 14 and 16 which fluid, carrying with it swarf, thereafter exits the borehole through swarf channels 22 and 24.

One end 26 of tubular shank 12 is mounted in a hollow cylindrical holder 28, the holder having an opening 30 in fluid communication with conduits 14 and 16 of shank 12. Holder 28 is connected to a source of pressurized coolant (not shown).

A solid cutting tool in the form of a drilling tip 32, preferably comprised of tungsten carbide, and having a cross-section similar to that of shank 12 is brazed onto the other end of shank 12. The mating area between drilling tip 32 and shank 12 is V-shaped to provide a larger brazing contact surface as compared to prior art devices.

Tungsten carbide tip 32, as better seen in FIGS. 3 and 4 includes first and second cutting edges 34 and 36 which are tapered as shown in FIG. 3 to form chip breakers that reduce the end load on the drill through more efficient chipping of the material. Behind cutting edges 34 and 36, viewed with respect to the rotational direction indicated by arrow 38, are burnishing pads 40 and 42 which support the cutting edges and which define round exterior burnishing surfaces 44 and 46 for burnishing the bore that is being formed.

Burnishing pads 40 and 42 define coolant chambers 60 and 62 (FIG. 5) which are in respective fluid communication with conduits 14 and 16 of shank 12. One coolant hole 48 is provided in each burnishing pad through which coolant emerges directly behind the cutting edge 34 or 36. Rather than being carried away by the cutting edge, the coolant meets the debris and swarf generated by the other cutting edge and washes it directly into the swarf clearance channel 22 or 24 which is rotating directly behind it.

The revolving swarf impinges upon the outside surface of cutting tool 32 which covers and protects shank 12 in the cutting area. Thus, cutting tool 32 absorbs the major portion of the forces generated by the twirling swaft, protecting the weaker material of shank 12 and the brazed connection.

Thus, in accordance with the present invention, there is provided a drill bit which provides a sturdier tubular shank which defines sufficiently large swarf clearance channels and through which coolant is directed such that swarf cannot collect in the borehole and impede the drilling operation. The tapered cutting edges of the drill bit chip the swarf more finely to enable more efficient swarf removal from the cutting area. The swarf does not pass over the coolant holes in the cutting tool, avoiding coolant supply blockage.

Although the present invention was described in reference to a specific embodiment thereof, many other modifications and variations will now become apparent to those skilld in the art. It is therefore preferred that the present invention be limited not by the specific embodiment herein, but only by the appended claims.

What is claimed is:

1. A drill bit comprising:
    a tubular shank having a holding end, a cutting tool end, an interior, and an exterior periphery, the shank further having a solid axial center of a predetermined width and thickness and defining first and second opposed and longitudinally extending fluid conduits through the interior thereof and first and second opposed and longitudinally extending swarf clearance channels along its exterior periphery, the solid center being formed of inwardly indented opposite peripheral walls of the shank which contact each other over the predetermined width of the solid center, the walls having respective thicknesses associated therewith, the thickness of the solid center being equal to the sum of the respective thicknesses of the opposite peripheral walls which are in contact with one another; and
    a cutting tool formed to fit over the cutting tool end of the shank, the tool having first and second tubular chambers in fluid communication respectively with the first and second fluid conduits in the shank and a respective coolant hole in each chamber through which coolant will flow to a cutting area, the tool having a top end and a respective cutting edge at the top end for each tubular chamber of the cutting tool.

2. The drill bit of claim 1 in which the solid center extends substantially along a major plane and in which the major plane of the solid center is so oriented that the first and second fluid conduits are located on opposite sides of the major plane.

3. The drill bit of claim 1 in which a side peripheral wall in each tubular chamber of the cutting tool is curved to form a burnishing pad for burnishing a borehole created by the drill bit.

4. The drill bit of claim 1 in which each cutting edge tapers downwardly from the axial center of the cutting tool toward the holding end of the shank whereby the load on the cutting tool is reduced and smaller swarf and debris is produced by a cutting operation carried out with the drill bit.

5. The drill bit of claim 1 in which the cutting tool is brazed to the tubular shank.

6. The drill bit of claim 1 which comprises a hollow cylindrical holder which is fitted over the holding end of the shank, the holder having an opening for supplying a coolant to the tool.

7. The drill bit of claim 1 in which each one of the first and second fluid conduits and the first and second swarf clearance channels has a generally wedge shaped cross-section.

8. The drill bit of claim 1 in which the cutting tool and the tubular shank have V-shaped mating surfaces.

9. The drill bit of claim 1 in which the cutting tool comprises tungsten carbide.

10. The drill bit of claim 1 in which the respective coolant hole in each of the tubular chambers is located rotationally behind its respective cutting edge.

11. The drill bit of claim 1 in which the respective coolant hole in each chamber is so situated that fluid flows out of the cutting tool generally in the same direction in which the fluid flows in the shank.

12. A drill bit comprising:

a tubular shank having a holding end, a cutting tool end, an interior, a peripheral wall of a predetermined thickness and an exterior periphery, the shank further having a solid axial center and defining first and second opposed and longitudinally extending fluid conduits through the interior of the shank, first and second opposed and longitudinally extending swarf clearance channels along the exterior periphery of the shank, the solid center being formed of inwardly indented opposite wall sections of the peripheral wall of the shank which contact each other to form the solid center, the solid center having a thickness which is equal to the combined thicknesses of the indented sections, the solid center extending along a major, generally flat, plane, each of the indented sections being indented along a respective dent line and the respective dent line of one of the indented sections being offset from the dent line of the other indented section along the major plane; and a cutting tool formed to fit over the cutting tool end of the shank, the tool having at least one tubular chamber in fluid communication with at least one of the first and second fluid conduits in the shank, at least one respective coolant hole in the chamber through which coolant will flow to a cutting area, and at least one cutting edge at the chamber of the cutting tool.

* * * * *